United States Patent
Tripathi et al.

(10) Patent No.: US 8,631,469 B2
(45) Date of Patent: Jan. 14, 2014

(54) EXECUTING COMMANDS ON DEVICES THROUGH PRESENCE APPLICATIONS

(75) Inventors: Ashutosh Tripathi, Hyderabad (IN); Rahul Singh, Hyderabad (IN); Balasubramanian Rajagopalan, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 12/541,808

(22) Filed: Aug. 14, 2009

(65) Prior Publication Data

US 2011/0041159 A1    Feb. 17, 2011

(51) Int. Cl.
*H04L 29/06* (2006.01)
*G06F 21/00* (2013.01)

(52) U.S. Cl.
USPC ............. 726/4; 726/29; 726/28; 713/168

(58) Field of Classification Search
None
See application file for complete search history.

(56) References Cited

U.S. PATENT DOCUMENTS

| | | | |
|---|---|---|---|
| 7,454,781 B2 | 11/2008 | Tachizawa et al. | 726/3 |
| 7,548,756 B2 | 6/2009 | Velthuis et al. | 455/466 |
| 7,685,246 B2 * | 3/2010 | Lingafelt et al. | 709/206 |
| 2004/0082361 A1 | 4/2004 | Rajagopalan | 455/556.1 |
| 2006/0095522 A1 | 5/2006 | Rang et al. | 709/206 |
| 2007/0162605 A1 | 7/2007 | Chalasani et al. | 709/227 |
| 2007/0174405 A1 * | 7/2007 | Chen et al. | 709/207 |
| 2007/0185967 A1 | 8/2007 | Hayes | 709/208 |
| 2007/0250571 A1 * | 10/2007 | Griffin, Jr. | 709/204 |
| 2008/0189374 A1 | 8/2008 | Odell et al. | 709/206 |
| 2008/0313356 A1 * | 12/2008 | Blinn et al. | 710/7 |
| 2009/0327436 A1 * | 12/2009 | Chen | 709/206 |
| 2010/0217837 A1 * | 8/2010 | Ansari et al. | 709/218 |

FOREIGN PATENT DOCUMENTS

EP    1898577    3/2008    ............. H04L 12/58

OTHER PUBLICATIONS

TechWeb News; "*AOL lets IM Users Log On From Multiple Locations*"; InformationWeek; Nov. 20, 2003; 1 Pg.
Vosburg, S.; "*Beyond IM: Instant Messaging Grows Up*"; Business Strategy Australasia; 2 Pgs.
Parviainen, et al.; "*Mobile Instant Messaging*"; Centre for Distance-spanning Technology, Department of Computer Science, Lulea University of Technology, Sweden; 2003 IEEE; 6 Pgs.

* cited by examiner

*Primary Examiner* — Gilberto Barron, Jr.
*Assistant Examiner* — Izunna Okeke
(74) *Attorney, Agent, or Firm* — Merchant & Gould

(57) ABSTRACT

Presence applications running on different devices are used to access and command devices through a communications server. A communication channel is established between at least two instances of a presence application that are running on different devices. A device that is associated with an instance of a presence application is remotely commanded by a received message from the communications server from another instance of the presence application on a different device.

20 Claims, 4 Drawing Sheets

EXECUTING COMMANDS ON DEVICES THROUGH PRESENCE APPLICATIONS

BACKGROUND

Different communication applications are designed to make communication easier and more accessible by providing users with a variety of information and functionality. For example, a user may have the ability to: view real-time presence information of users; reach a user using a single contact method; support instant messaging (IM) capability; and the like. These applications rely on each of the devices communicating to be connected to a network in order to receive messages over the network. Many of these applications may be run on a variety of devices including mobile devices and other computers. The same user may be logged onto the communication system from different devices. For example, a user may be running the communication application on their mobile phone, a laptop computer, as well as a desktop computing device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Presence applications running on different devices are used to access and command devices through a communications server. A communication channel is established between at least two instances of a presence application that are running on different devices. A device that is associated with an instance of a presence application is remotely commanded by a received message from the communications server from another instance of the presence application on a different device.

DETAILED DESCRIPTION

Figure 1:
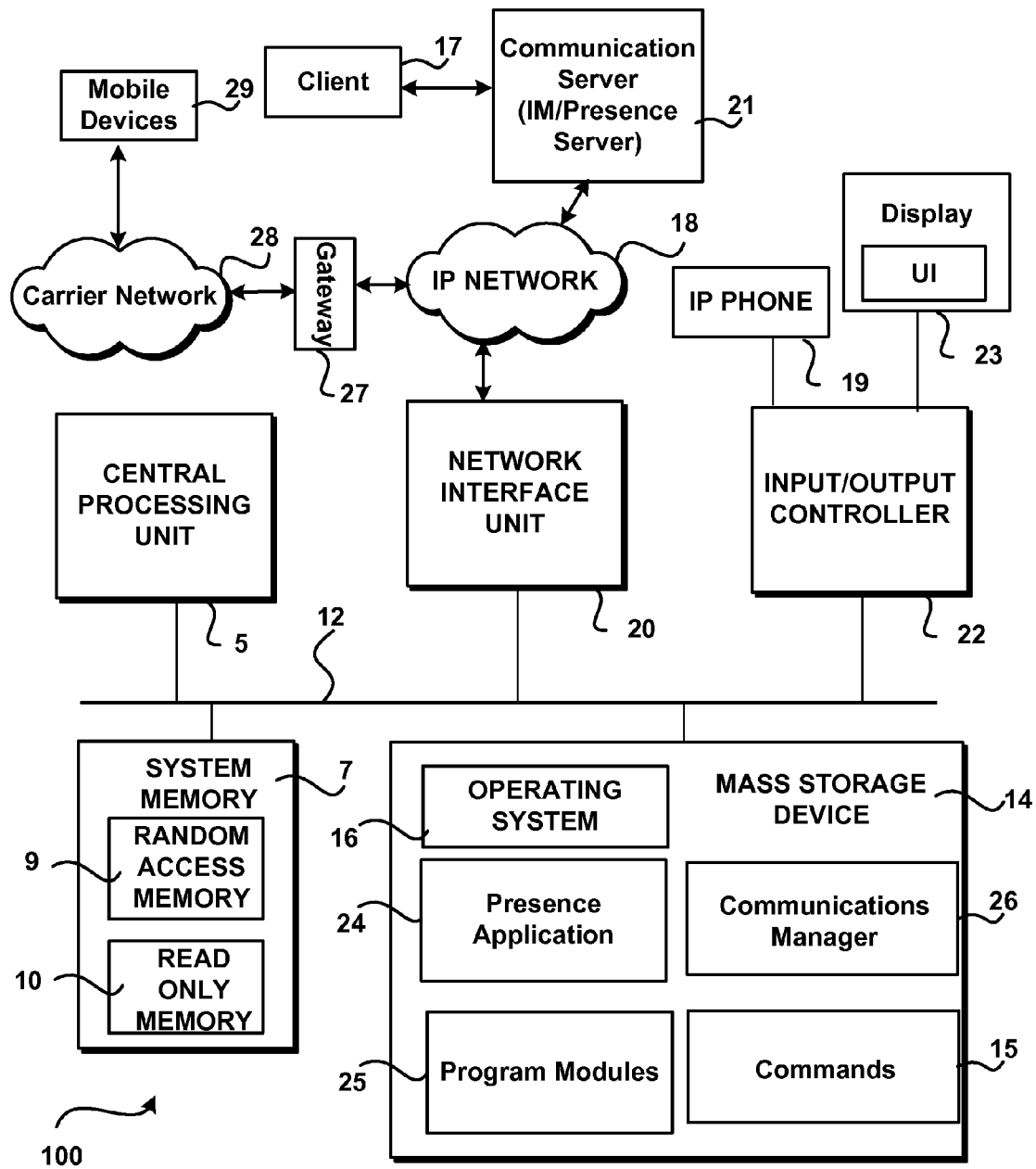
FIG. 1 illustrates an exemplary computing environment.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program(s) 24, other program modules 25, and communication manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone 19, a display screen 23, a printer, or other type of output device.

Carrier network 28 is a network responsible for communicating with mobile devices 29. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like.

Gateway 27 routes messages between carrier network 28 and IP Network 18. For example, communications manager 26 may route a call or some other message to a mobile device on carrier network 28 and/or route a call or some other message to a user's device on IP network 18. Gateway 27 provides a means for transporting the communication from the IP network to the carrier network. Conversely, a user with a device connected to a carrier network may be directing a call to a client on IP network 18.

As mentioned briefly above, a number of program modules and data files may be stored in the mass storage device 14 and RAM 9 of the computer 100, including an operating system 16 suitable for controlling the operation of a computer, such as WINDOWS COMMUNICATION SERVER®, WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs 24 and program modules 25.

Communications manager 26 is configured to process commands received from other devices through a communication channel that is established between a device and a communication server 21, such as an Instant Messaging (IM)/Presence server. For example, a user that is signed into the IM/Presence server 21 multiple times through different devices may remotely command one of the devices through an instance of the presence application on a device. Generally, communications manager 26 receives a command from IM/Presence server 21 that is created at another device (i.e. client 17), executes the command on computing device 100, and returns any result of executing the command to the IM/Presence server 21 for return to the client device and/or some other device.

User Interface (UI) may be utilized to view/edit commands, assign permissions for execution of commands 15, as well as other activities relating to executing commands on a remote device through an IM/Presence server. For example, a user may create a command that is to be executed on client 17. Commands 15 may be any command(s) that are authorized to execute on computing device 100. These commands may be configured to be any command that can be run on computing device 100, including but not limited to: searching, interacting with files, performing calculations, and the like. Commands 15 may be configured by a user and/or the commands within commands 15 may be obtained directly from specifications that are associated with computing device 100.

According to one embodiment, communications manager 26 communicates with a presence application program 24 such as MICROSOFT's OFFICE COMMUNICATOR®. While communications manager 26 is illustrated as an independent program, the functionality may be integrated into other software and/or hardware. The operation of communications manager 26 is described in more detail below.

Figure 2:
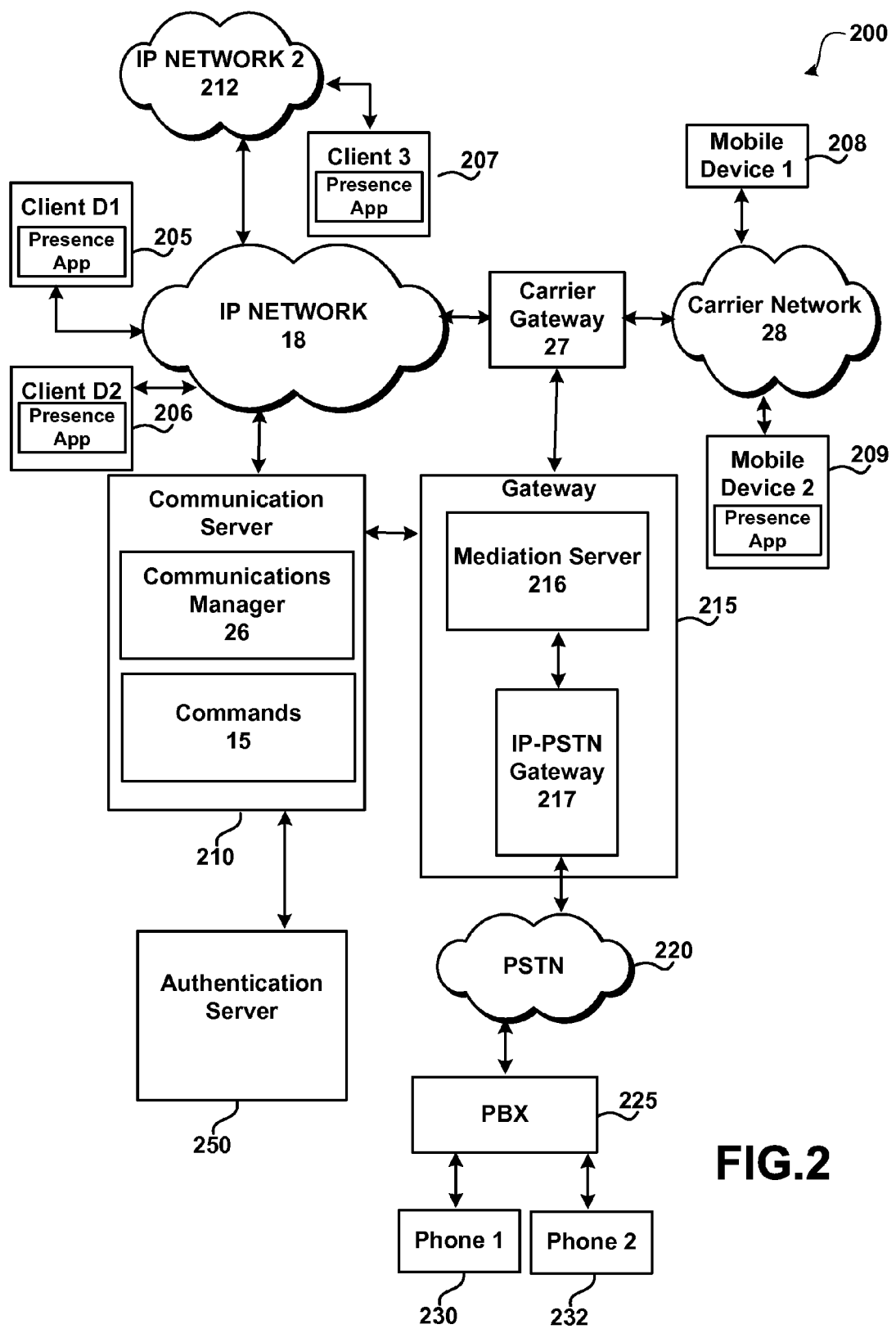
FIG. 2 shows a communications system for remotely commanding a device through an instance of a presence application.

FIG. 2 shows a communications system for remotely commanding a device through an instance of a presence application. As illustrated, system 200 includes client D1 (205) and client D2 (206) that is coupled to IP Network 18, client 3 (207) that is coupled to IP Network 2 (212), mobile device 1 (208) and mobile device 2 (209) that are coupled to carrier network 28, communication server 210 including communications manager 26, authentication server 250, carrier gateway 27, gateway 215, mediation server 216, IP-PSTN gateway 217 coupled to PBX 225 through PSTN 220 and phone 1 (230) and phone 2 (232).

The communication server 210 is configured as an Instant Messaging/Presence server and acts as an aggregator and mediator between clients. Communication server 210 is also configured to route incoming communications to the appropriate destinations. According to one embodiment, communications server 210 runs Microsoft's OFFICE COMMUNICATION SERVER® operating system. In the example shown, client devices 205 and 206 are associated with the same user and client device 207 is associated with a different user. Some of the client devices (205, 206, 207 and 209) are configured with a presence application, such as Microsoft's OFFICE COMMUNICATOR® application. Other presence applications may also be configured to process commands received from other client devices through a coupled IM/Presence server. Other client devices, associated with the same/other users, may also be connected to communication server 210 (i.e. mobile device 1 (208) and mobile device 2 (209)).

According to one embodiment, communications server 210 utilizes SIP for communication sessions. For more information on this industry standard protocol see IETF RFC 3261 which may be found at http://www.ietf.org/rfc/rfc3261.txt. Generally, SIP defines a standard for session setup, termination, and media negotiation between two parties that is widely used for Voice-over-IP (VoIP) call signaling.

Generally, communication server 210 routes communications/calls to endpoints on the IP network (IP-IP calls); routes calls to the public switched telephone network (PSTN)/PBX (IP-PSTN calls) and may also route calls to destinations using other networks, such as a carrier network. The communication server 210 may be coupled to the networks through one or more gateways. A gateway translates signaling and media between the network and the IP voice infrastructure. The gateway 215 may be composed of one or more devices. For example, the gateway 215 may be implemented as a mediation server 216 and an IP-PSTN gateway 217 or the functionality of the mediation server and the IP-PSTN may be included within the gateway as illustrated. Generally, IP-PSTN gateway 217 is a gateway that is located between a landline phone (i.e. phone 1 (230) or phone 2 (232)) and any SIP User Agent Client (i.e. client D1 (205), client D2 (206), client 3 207)). Gateway 217 allows a person to call any (allowed) telephone number from any SIP-compliant client application.

Mediation Server 216 provides signaling and media translation between the VoIP infrastructure and a gateway. Mediation Server 216 also links the Communication Server 210 with a PBX 225. On the communications server side, the mediation server 216 listens on a mutual TLS transport address. TLS (Transport Layer Security), is a protocol for establishing a secure connection between a client and a server. TLS (Transport Layer Security) is capable of authenticating both the client and the server and creating a encrypted connection between the two. The TLS (Transport Layer Security) protocol is extensible, meaning that new algorithms can be added for any of these purposes, as long as both the server and the client are aware of the new algorithms. On the gateway side, mediation server listens on a single TCP/IP transport address. Generally, the mediation server 216 is configured for: translating SIP over TCP (on the gateway side) to SIP over mutual TLS (on the Enterprise Voice side); encrypting and decrypting SRTP (Secure Real-time Transport Protocol) on the communications server side; translating media streams between the communications server and the gateway; connecting clients that are outside the network to internal ICE (Interactive Connectivity Establishment) components, which enable media traversal of NAT and firewalls; and acting as an intermediary for call flows that a gateway does not support, such as calls from remote workers on an enterprise voice client.

Communications server 210 may be configured to provide communication services for one or more locations. For example, communications server 210 may be utilized for a business having branch offices that are connected using IP Network 18 and/or other IP networks (e.g. IP Network 2 (212)). For example, Client 3 may be located at a branch office while communication server 210 is located at the main office.

Communication Server 210 is also configured to process commands that are received from a client device and are to be executed on another client device. In this way, even when a client device does not have a remote access program, a user may communicate commands through instances of a presence application which the user has signed on and/or has authorized other users to execute commands on their device. The commands are received through a communication channel that has been established for communications between devices. For example, the commands may be received through a standard IM message and/or some other type of communication that is supported by the IM/Presence communication server.

Messages that are received from the same user that is logged onto the current device are automatically interpreted by communication server 210 as a command. According to another embodiment, a message that is received from a user on a first device may be identified as a command that is to be executed remotely on a second device when authorized by the user of the second device. For example, a user may allow one or more other users, the ability to execute some/all of the available commands on their device.

For purposes of explanation, assume that a user has started an instance of a presence application on client devices 205 and 206. The user signs into the communication system through both devices 205 and 206 and supplies his/her credentials to communications server 210. As illustrated, authentication server 250 authenticates the user and allows them access to the communications system when authenticated. Similarly, the other devices coupled to the communications server 210 may also sign in to the communications system. When the user sends a message to themselves, then communication server 210 receives the communication (i.e. an IM message) and automatically determines this to be a command from the user.

The communication may include any command that is supported by the client device. According to one embodiment, the commands 15 include standard commands and custom commands that are supported by the client devices that are coupled to the communication system. The standard commands are those for which constructs of the command are predefined, including but not limited to: transferring a file on the device to another device, emailing a file, checking the status of a component on the device, remotely commanding applications on the device, searching for a file, searching within a file, obtaining a file, storing a file, and the like. Custom commands are commands that are made through a combination of the commands available from the client device. For example, a command may be constructed that first searches for files on the client device and then searches within the returned files for another search term The commands 15 may be configured to provide the user with results from execution of the command (i.e. search results). Generally, any command that may be executed by a user on one of the client devices for which the user has an account can be executed by delivering a message from an instance of application 24 to another instance of application 24.

Figure 3:
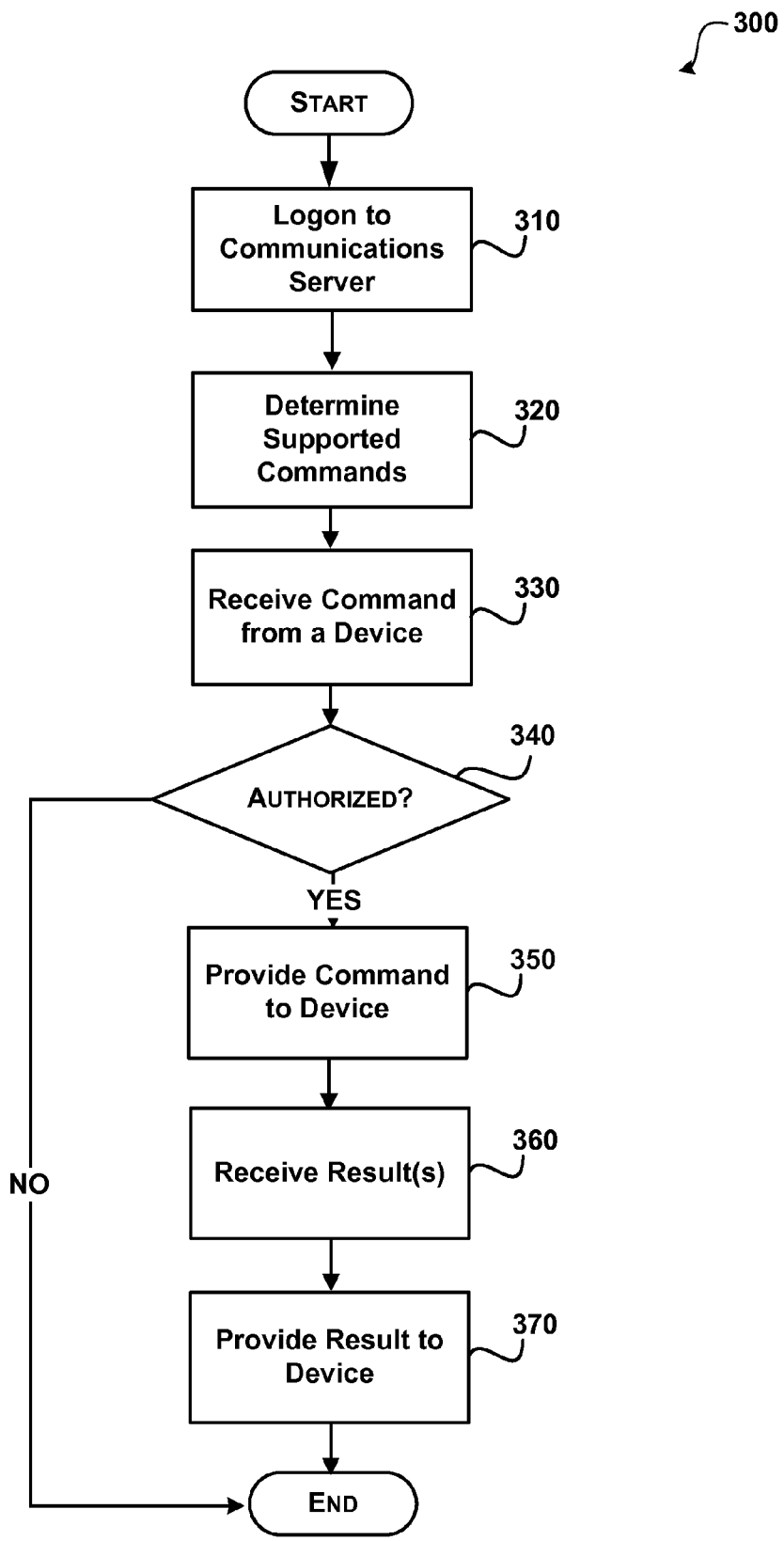
FIG. 3 illustrates an illustrative process for remotely commanding a device through a presence application coupled to an IM/Presence server.

Referring now to FIG. 3, an illustrative process 300 for remotely commanding a device through a presence application coupled to an IM/Presence server will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where a user logs onto the communication system with one or more devices. For example, a client may log on to the communications system with a mobile device and a desktop device. Once logged onto the system, the user and the devices may communicate using an IM/Presence server with other users/devices that are also logged onto the system.

Moving to operation 320, the communications server determines the commands that are supported by each of the client devices. The supported commands may be determined by querying the client devices and/or some other method. For example, a synchronization method may be utilized to obtain the supported commands. The commands may be common to the devices and/or the commands may be unique to the device. Devices may be queried before a command is received and/or after a command is received. For example, the IM/Presence server may be configured to wait until a command is received to be executed on a device until the server queries the device to determine the available commands. Alternatively, the command may be automatically passed to the device without querying. In this case, the device itself may analyze the command to determine if the command is allowed to be executed on the device.

Flowing to operation 330, a message (i.e. an IM message) is received by a client device that is coupled to the communications server. When the IM message is received, a determination is made as to whether the message is a command that is to be executed on another device. When the message is received from a user on one device that is directed to the same user on a different device then the message is automatically determined to be a command. When the message is received from a user and is directed to another user then the message is examined to determine if the message is a command. The message may be identified to be a command in many different ways. For example, a header of the message could indicate that the message is to be interpreted as a command. Additionally, the message itself could be examined to determine if the message corresponds to one of the supported commands on the device.

Transitioning to decision operation 340, a determination is made as to whether the user is authorized to execute the command on the device. When the command is for the same user's device then the user is automatically authorized to perform the command. When the command is for another user's device, then the communication server determines whether the user who sent the command is authorized to perform the command on the other user's device. When the user is not authorized to perform the command, the process moves to an end block and returns to processing other actions. When the user is authorized, the process moves to operation 360.

At operation 350, the command is provided to the device through an established communication channel with the device. For example, a communication channel that is being utilized for IMs may be used.

Flowing to operation 360, once the device has executed the command, any results are returned and received by the communication server. The results may also be delivered to the communication server and/or provided to the device at operation 370 through the same channel of communication. Other methods may also be utilized. For example, results may be returned using email, Short Messaging Service (SMS), and the like. Generally, the results are the results generated from performing the command on the device, such as search results, a file, data generated from the command, a status, and the like.

The process then flows to an end operation and returns to processing other actions.

Figure 4:
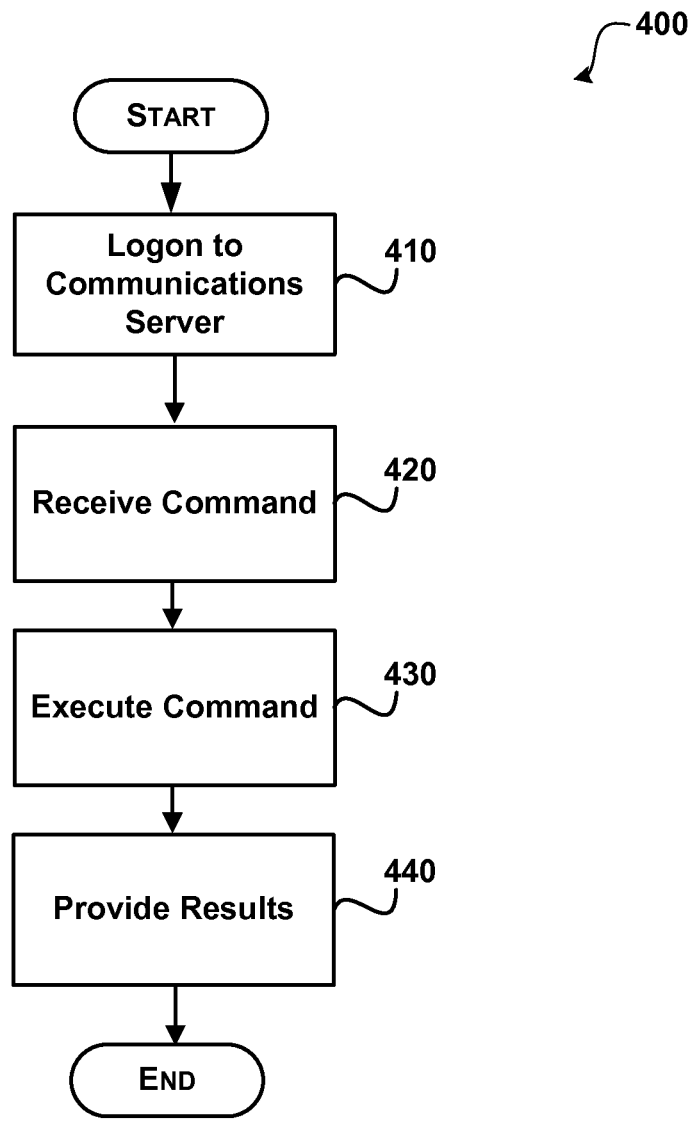
FIG. 4 shows an illustrative process for receiving a command from a remote device using a presence application that is coupled to an IM/Presence.

Referring now to FIG. 4, an illustrative process 400 for receiving a command from a remote device using a presence application that is coupled to an IM/Presence server will be described.

After a start operation, the process flows to operation 410, where a user logs onto the communication system with one or more devices. For example, a client may log on to the communications system with a mobile device and a desktop device. Once logged onto the system, the user and their devices may communicate with other users/devices that are also logged onto the system.

Moving to operation 420, a message (i.e. an IM message) is received by the client device from the communications server. When the IM message is received, a determination is made as to whether the message is a command that is to be executed by the device. The message may be identified to be a command in many different ways. For example, a header of the message may indicate that the message is to be interpreted as a command. Additionally, the message itself may be examined to determine if the message corresponds to one of the supported commands on the device.

Transitioning to operation 430, the command is executed on the device and any results from executing the command are generated.

Flowing to operation 440, the results are provided. The results may be sent to the communication server and/or delivered using some other method. For example, results may be returned using email, Short Messaging Service (SMS), and the like.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for remotely executing commands on a computing device coupled to a communications server through a presence application, comprising:
   authenticating a first login that is associated with a first device and a first presence application and authenticating a second login that is associated with a second device and a second presence application at a communications system; wherein the communications system comprises a communications server that is configured as an Instant Messaging and Presence server;
   establishing a communication channel between the first device and the second device used for communicating between the first device and the second device and receiving commands to execute on the first device from the second device and receiving commands to execute on the second device from the first device;
   determining when a communication received at the communications server is from the first device that is directed to the second device;
   determining when the communication received at the communications server is from the second device that is directed to the first device;
   determining when the communication is a command that is to be executed on the second device when the communication comes from the first device and determining when the incoming communication is a command that is to be executed on the first device when the communication comes from the second device;
   authorizing the command to be executed on the first device when it is determined that a second user that is associated with the second login is authorized to execute commands on the first device;
   authorizing the command to be executed on the second device when it is determined that a first user that is associated with the first login is authorized to execute commands on the second device; and
   routing the communication to the second device when the communication comes from the first device and routing the communication to the first device when coming from the second device; wherein the command is executed on the second device when the communication comes from the first device and wherein the command is executed on the first device when the communication comes from the second device.

2. The method of claim 1, further comprising receiving results from the second device; wherein the results are obtained from the execution of the command on the second device.

3. The method of claim 2, further comprising authorizing the command to be executed on the second device or the first device.

4. The method of claim 3, wherein authorizing the command to be executed on the second device or the first device comprises automatically authorizing the command to be executed when the first login and the second login are associated with the same user.

5. The method of claim 1, further comprising receiving results from the first device; wherein the results are obtained from the execution of the command on the first device.

6. The method of claim 1, further comprising determining commands that are allowed to be executed on the second device or the first device.

7. The method of claim 1, wherein the communication channel is configured for receiving/sending Instant Messages (IMs).

8. The method of claim 1, wherein the command is encoded within a SIP message.

9. The method of claim 1, wherein the command is routed to a plurality of devices that are logged onto the communications system.

10. The method of claim 1, wherein the command includes a plurality of commands that are to be executed on the second device.

11. A computer-readable storage memory having computer-executable instructions for remotely executing commands on a computing device coupled to a communications server through a presence application, comprising:

authenticating a first user for a first login that is associated with a first device and a first presence application and authenticating a second user for a second login that is associated with a second device and a second presence application at a communications system;

wherein the communications system comprises a communications server that is configured as an Instant Messaging and Presence server;

determining when a communication received at the communications server is from the first device that is directed to the second device;

determining when the communication received at the communications server is from the second device that is directed to the first device;

automatically determining that the incoming communication is a command that is to be executed on either the first device or the second device;

authorizing the command to be executed on the first device when it is determined that the second user that is associated with the second login is authorized to execute commands on the first device;

authorizing the command to be executed on the second device when it is determined that the first user that is associated with the first login is authorized to execute commands on the second device; and routing the communication to the determined device where the command is executed.

12. The computer-readable storage memory of claim 11, further comprising receiving results from the second device through the communication channel; wherein the results are obtained from the execution of the command on the second device.

13. The computer-readable storage memory of claim 11, further comprising determining commands that are allowed to be executed on the first device or second device.

14. The computer-readable storage memory of claim 11, wherein a communication channel is configured for receiving/sending Instant Messages (IMs) and wherein the command is included within an IM message.

15. The computer-readable storage memory of claim 11, wherein the command is encoded within a SIP message.

16. A system for remotely executing commands on a computing device coupled to a communications server through a presence application, comprising:

a data store that is configured to store commands that are allowed to be executed by a remote device; wherein the commands comprise: a search command, a document retrieval command that includes obtaining a file, a document storage command that includes storing a file, a device status command, and a custom command;

a network connection that is configured to connect to the IP network;

a processor and a computer-readable medium;

an operating environment stored on the computer-readable medium and executing on the processor; and a communications manager operating under the control of the operating environment and operative to:

login to a communications system; wherein the communications system comprises a communications server that is configured as an Instant Messaging and Presence server;

receive a communication from the communications server that is an IM message from another device;

determine when the incoming communication is a command that is to be executed;

authorizing the command to be executed when it is determined that a user that is associated with the login has authorized the another device to execute commands;

execute the command; and send a communication to the communications server that includes another command to execute on another device.

17. The system of claim 16, further comprising providing results from the execution of the command to the communications server.

18. The system of claim 16, further comprising determining when the command is received from a different user that is logged onto the communications system and determining when the different user is authorized to execute the command.

19. The system of claim 16, wherein the command is encoded within a SIP message that is received from the communications server.

20. The system of claim 16, wherein the command includes a plurality of commands that are to be executed.

* * * * *